Patented Dec. 2, 1952

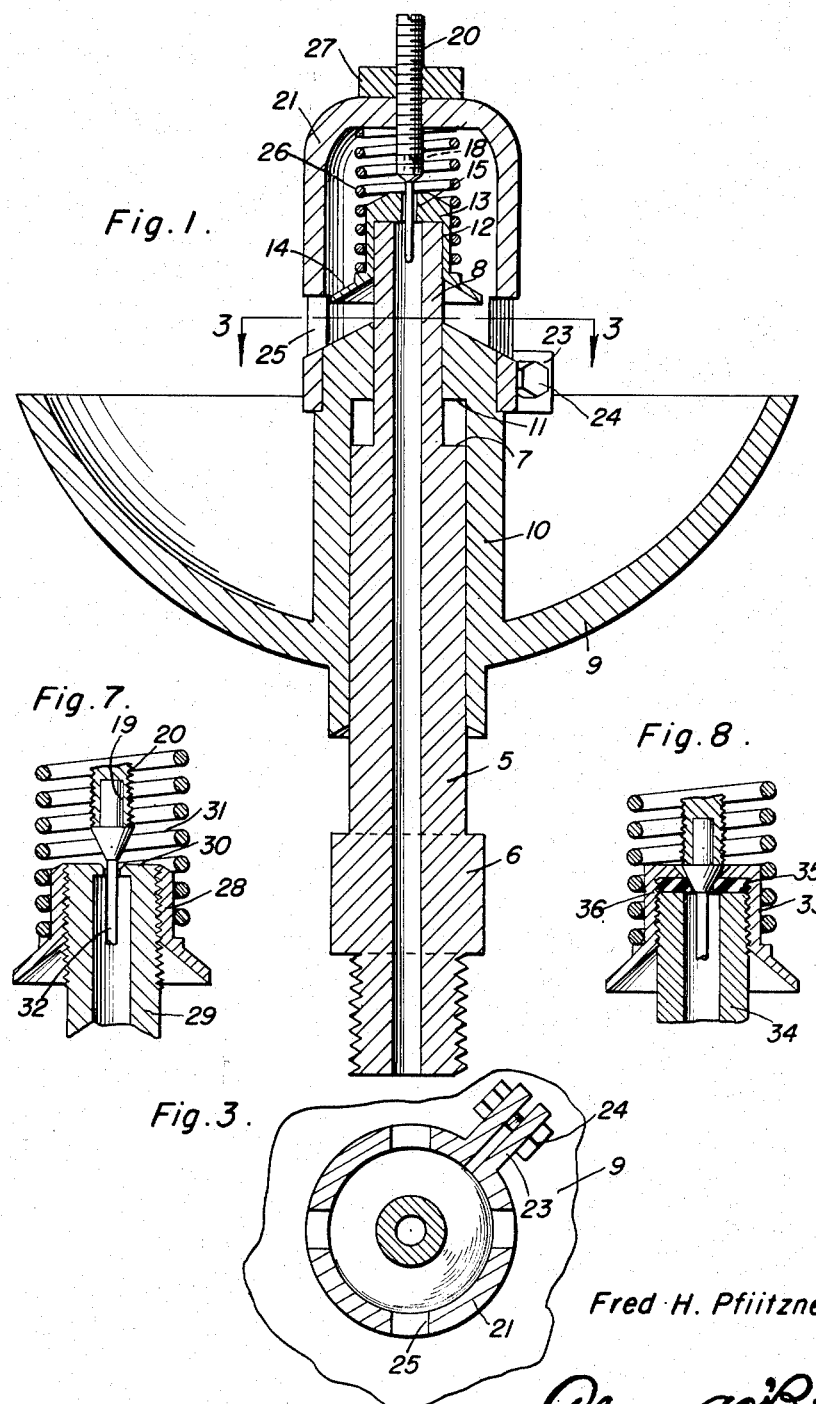

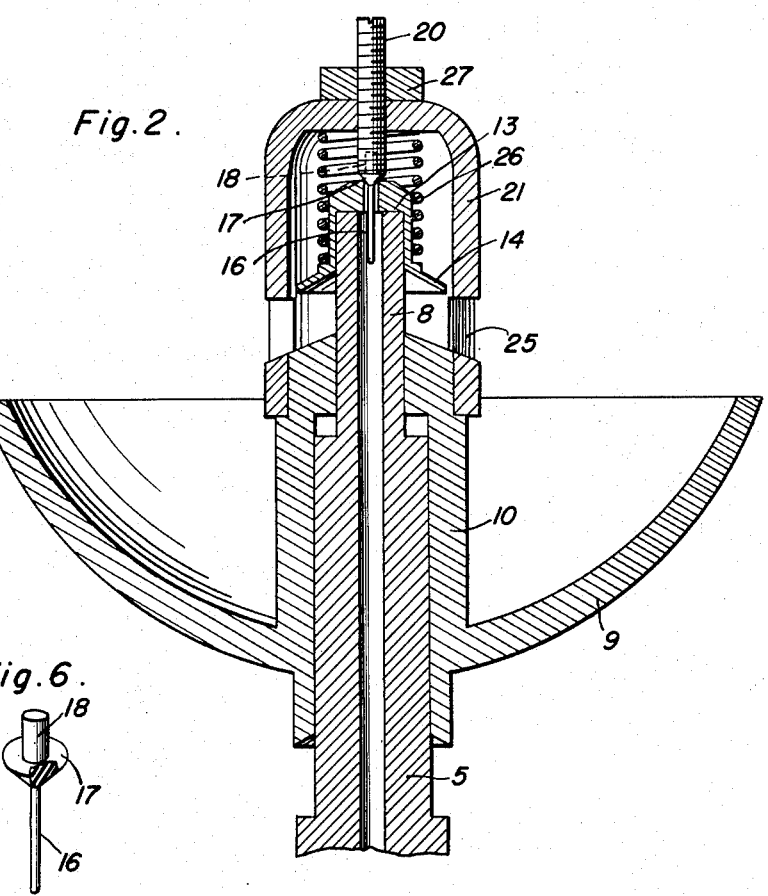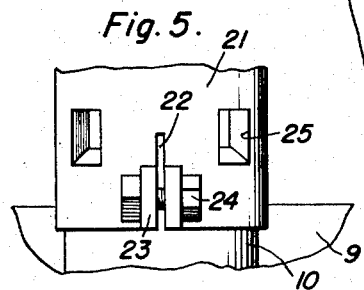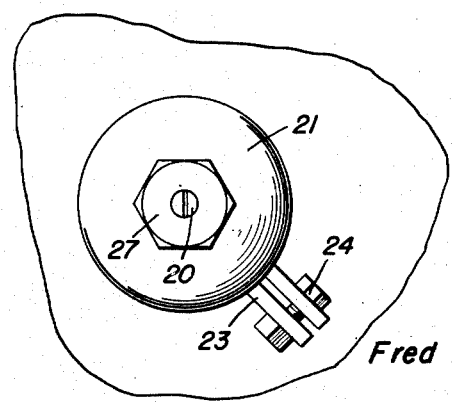

2,619,981

UNITED STATES PATENT OFFICE 2,619,981

AUTOMATIC, NONCLOGGING WATERING CUP FOR POULTRY AND LIVESTOCK WATERING APPARATUS

Fred H. Pfiitzner, Cuyama, Calif.

Application November 13, 1947, Serial No. 785,764

10 Claims. (Cl. 137—408)

1

The present invention relates to new and useful improvements in poultry and live stock watering apparatus and more particularly to a novel automatically controlled valve for regulating the flow of water.

An important object of the present invention is to provide a non-clogging valve of this character.

A further object of the invention is to provide a pressure responsive valve for movement into an open position by pressure of water subjected thereto and a gravity operated watering cup to close the valve by the weight of the water therein when reaching a predetermined level in the cup.

Another object of the invention is to provide spring suspension means for the watering cup operating to hold the valve in an open position.

A further object of the invention is to provide adjustable means carried by the watering cup for the valve to regulate the opening and closing movement thereof and including a pressure operated independent movable valve and constructed for convenient removal without necessitating removal of the cup.

A still further object is to provide a device of this character of simple and practical construction, which is efficient and reliable in operation, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a vertical sectional view showing the valve in open posiiton;

Figure 2 is a similar view showing the valve closed;

Figure 3 is a transverse sectional view taken on a line 3—3 of Figure 1;

Figure 4 is a top plan view;

Figure 5 is a fragmentary side elevational view showing the clamping lugs for securing the cap to the cup;

Figure 6 is an enlarged perspective view of the valve;

Figure 7 is a fragmentary vertical sectional view of the valve and illustrating a modified deflector construction carried at the upper end of the supply pipe, and Figure 8 is a similar view of a modified valve seat construction.

2

Referring now to the drawings in detail the numeral 5 designates an upstanding supply pipe having a polygonal wrench engaging portion 6 adjacent the lower end of the pipe for attaching the supply pipe in an upstanding position in a supply line. The upper end of the pipe is formed with an annular shoulder 7 to provide a reduced neck 8 at its upper end.

A watering cup 9 is formed at its central portion with a vertically extending tube 10 slidably mounted on the pipe 5, the upper end of the tube having an internal shoulder 11 engaging the shoulder 7 of the pipe to limit downward movement of the cup thereon.

A deflector designated generally at 12 includes a cap portion 13 fitted over the upper end of the neck 8 and is formed with a frusto-conical flange 14 at its lower edge. The top of the cap portion 13 is provided with a central opening 15 and in which a valve stem 16 is loosely positioned for vertical sliding movement in the opening. A conical valve 17 is formed on the upper portion of the stem 16 and above the valve is a guide stem 18 slidably positioned in a recess 19 at the lower end of an adjusting screw 20.

The adjusting screw 20 is threaded through the upper end of a cap or cage 21 which encloses the upper end of the neck 8 and deflector 12, one side of the cap 21 at its lower end being formed with a vertically extending slot 22 provided at its edges with apertured ears 23 having a bolt and nut 24 extending therethrough for clamping the lower end of the cap on the upper end of the tube 10 of the cup 9. Discharge openings 25 are formed in the lower portion of the cap 21 below the deflector 12.

A coil spring 26 is positioned with its lower end resting on the deflector 12 and its upper end bearing against the underside of the cap 21 to hold the cap and the cup 9 in a raised position and with the valve 17 open, as shown in Figure 1 of the drawings.

The adjustment of the screw 20 regulates the opening of valve 17 and the screw is secured in its adjusted position by a lock nut 27.

In the operation of the device when the watering cup 9 is empty the spring 26 will hold the cup and the cap 21 in a raised position and the valve 17 will gravitate into a closed position at the upper end of opening 15 when the supply of water rising in pipe 5 is cut off. Pressure of water entering pipe 5 will open the valve 17 to fill the cup 9 and weight of the water in the cup will move the cup downwardly to lower the cap 21 and thus move the valve 17 into a closed position to cut off the supply of water.

The conical flange 14 on the lower end of deflector 12 deflects water toward the walls of cap 21 and discharge openings 25 and away from supply pipe 8 to prevent water passing downwardly around the supply pipe. The beveled upper end of tube 10 also deflects water toward discharge openings 25 and prevents water accumulated in the cap 21 from rising to a point to cause leakage around the neck of the supply pipe.

In Figure 7 of the drawings I have illustrated a modified deflector construction 28 which is open at its top and threaded on the upper end of the neck 29 of the supply pipe. The upper end of the supply pipe is formed with a valve seat 30 for engagement by the valve 31. The stem 32 projecting from the lower end of the valve works loosely through the opening in the top of the neck 29 to prevent clogging thereof.

In Figure 8 of the drawings the deflector 33 is also threaded on the upper end of neck 34 of the supply pipe and a washer 35 is positioned between the upper end of the neck and the top of the deflector to provide an effective seat for the valve 36.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. An automatic watering device comprising an upstanding supply pipe, a cup, a vertical tube fixed to and extending through the center of the cup and slidably carried by the pipe, a cap for the upper end of the pipe carried by the tube, a valve in the cap, said valve being pressure operated for opening movement and gravity actuated for closing movement, said cap having discharge openings therein, and means carried by the pipe and concealed entirely within the cap for deflecting water passing from the upper end of the pipe toward the discharge openings and for preventing water passing downwardly around the supply pipe.

2. An automatic watering device comprising an upstanding supply pipe, a cap slidably carried by the pipe, a valve carried by the cap for closing the upper end of the pipe, said valve being gravity actuated for closing movement, counterbalancing means opposing closing movement of the valve, said cap including discharge openings, and a deflector carried by the upper end of said pipe and concealed entirely within the cap for directing water passing from the upper end of the pipe toward the discharge openings and for preventing water from passing downwardly around the supply pipe.

3. An automatic watering device comprising an upstanding supply pipe, a spring suspended cup slidably carried by the pipe, a valve carried by the cap for closing the upper end of the pipe upon a predetermined lowering movement of the cap, said cap including discharge openings, and a deflector mounted on the upper end of said pipe and concealed within the cap for directing water passing from the upper end of said pipe toward the discharge openings and for preventing water from passing downwardly around the supply pipe.

4. An automatic watering device comprising an upstanding supply pipe, an elongated spring suspended cap slidably carried by the pipe, a vertically adjustable valve carried by the cap for closing the upper end of the pipe upon a predetermined lowering movement of the cap, said cap having a plurality of circumferentially spaced delivery openings therein, and a deflector carried by the upper end of said pipe and concealed within the cap intermediate the ends of the cap for directing water passing from the upper end of said pipe toward the discharge openings and for preventing water from passing downwardly around the supply pipe.

5. An automatic watering device comprising an upstanding supply pipe, a spring suspended cage slidably carried by the pipe, a pressure actuated valve for the upper end of the pipe, an adjusting screw carried by the cage for regulating the valve, a cap member embracing the upper end of said pipe and disposed entirely within said cage, a frusto-conical deflector integrally formed with said cap member and also disposed entirely within the cage, and said cage having discharge openings for receiving water deflected by said deflector, said deflector preventing water from passing downwardly around the supply pipe.

6. An automatic valve comprising an upstanding supply pipe, a cup including a vertical tubular central portion slidably carried by the pipe, an elongated apertured cap having a lower open end carried by the upper end of the tubular central portion, said cap being positioned over the upper end of the pipe, a valve held in position on the upper end of the pipe by the cap, said valve being gravity closed and pressure opened, said cap having discharge openings therein, a further cap embracing the upper end of said pipe and disposed entirely within said first named cap, a deflector on said further cap and also disposed entirely within said first named cap for deflecting water passing from the upper end of the pipe toward the discharge openings and for also preventing water from passing downwardly around the supply pipe, and a coil spring surrounding the further cap, located within the first named cap and biased between the two caps to urge the valve to its open position until a predetermined amount of water has entered the cup.

7. An automatic valve comprising an upstanding supply pipe, a cup, a vertical tube fixed to and extending centrally through the cup, said tube being slidably carried by the pipe, an apertured cap carried by the upper end of the tube and positioned over the upper end of the pipe, a valve held in position on the upper end of the pipe by the cap, said valve being gravity closed, counterbalancing means between the pipe and the cap holding the valve open, said counterbalancing means being disposed entirely within said cap, said cap having delivery openings therein, and a deflector carried by the pipe and concealed within the cap for deflecting water passing from the upper end of the pipe toward the discharge openings and for preventing water from passing downwardly around the supply pipe.

8. An automatic valve comprising an upstanding supply pipe, a cup slidably carried by the pipe, an apertured cap carried by the cup positioned over the upper end of the pipe, a valve on the upper end of the pipe, an adjusting screw carried by the cap and engaging the valve to close the valve by gravity action of the cup, a coiled spring concealed within the cap and held between the pipe and the cap to open the valve, said cap having a plurality of delivery openings, and a deflector carried by said pipe and also concealed within the cap for deflecting water passing from the upper end of the pipe toward the discharge openings and for preventing water from passing downwardly around the supply pipe.

9. A watering cup comprising an upstanding supply pipe, an automatic valve for the upper end of the pipe, a gravity actuated cup for closing the valve and including a tube slidable on the pipe and a cap on the upper end of the tube, a conical deflector fitted over the upper end of the pipe and overlying the top of the tube to prevent leakage between the pipe and the tube, and said cap having delivery openings therein for receiving water passing from the upper end of the pipe and deflected by said conical deflector, said deflector being concealed within the cap.

10. A watering cup comprising an upstanding supply pipe, an automatic valve for the upper end of the pipe, a gravity actuated cup for closing the valve and including a tube slidable on the pipe and a cap secured to the upper end of the tube, said tube having a beveled upper end, and a conical deflector fitted on the upper end of the pipe and overlying the top of the tube to prevent leakage between the pipe and the tube, said cap having delivery openings, said deflector being concealed completely within said cap, and said conical deflector adapted to deflect water passing from the upper end of the pipe toward the discharge openings.

FRED H. PFIITZNER.

REFERENCES CITED

The following references are of record in the file of this patent:

UNITED STATES PATENTS

| Number | Name | Date |
|---|---|---|
| 1,131,046 | Dyer | Mar. 9, 1915 |
| 1,702,973 | Lord | Feb. 19, 1929 |
| 2,387,664 | Kubista | Oct. 23, 1945 |

FOREIGN PATENTS

| Number | Country | Date |
|---|---|---|
| 365,599 | Great Britain | of 1932 |